(12) United States Patent
Baskaran et al.

(10) Patent No.: US 12,232,139 B2
(45) Date of Patent: Feb. 18, 2025

(54) METHOD AND UE FOR DETERMINING DEFAULT BEAM BEHAVIOR IN WIRELESS NETWORK

(71) Applicant: Samsung Electronics Co., Ltd., Gyeonggi-do (KR)

(72) Inventors: Dhivagar Baskaran, Bangalore (IN); Youngrok Jang, Gyeonggi-do (KR); Hyoungju Ji, Gyeonggi-do (KR); Taehyoung Kim, Gyeonggi-do (KR); Karthik Muralidhar, Bangalore (IN)

(73) Assignee: Samsung Electronics Co., Ltd (KR)

( * ) Notice: Subject to any disclaimer, the term of this patent is extended or adjusted under 35 U.S.C. 154(b) by 48 days.

(21) Appl. No.: 18/140,923

(22) Filed: Apr. 28, 2023

(65) Prior Publication Data

US 2023/0269745 A1 Aug. 24, 2023

Related U.S. Application Data

(63) Continuation of application No. 17/531,041, filed on Nov. 19, 2021, now Pat. No. 11,683,810.

(30) Foreign Application Priority Data

Nov. 20, 2020 (IN) .............................. 202041050559
Jan. 13, 2021 (IN) .............................. 202141001630
(Continued)

(51) Int. Cl.
*H04W 72/23* (2023.01)
*H04L 5/00* (2006.01)

(52) U.S. Cl.
CPC ........... *H04W 72/23* (2023.01); *H04L 5/0048* (2013.01)

(58) Field of Classification Search
CPC .............................. H04W 72/23; H04L 5/0048
See application file for complete search history.

(56) References Cited

U.S. PATENT DOCUMENTS 11,082,154 B2 8/2021 Seo et al.
11,924,848 B2 * 3/2024 Saber ................... H04L 1/1819
(Continued)

FOREIGN PATENT DOCUMENTS

CN 110167036 8/2019
TW 202029803 8/2020
(Continued)

OTHER PUBLICATIONS

Asustek, "Interoperation between Cross-Carrier Scheduling and Multiple TRPs", R1-2008719, 3GPP TSG RAN WG1 #103-e, Oct. 26-Nov. 13, 2020, 4 pages.
(Continued)

*Primary Examiner* — Ronald B Abelson
(74) *Attorney, Agent, or Firm* — The Farrell Law Firm, P.C.

(57) ABSTRACT

The disclosure relates to a pre-5G or 5G communication system to be provided for supporting higher data rates beyond a 4G communication system, such as LTE. A method includes receiving, in a first search space and a second search space that are linked for PDCCH repetition, at least one PDCCH including DCI; and receiving a PDSCH scheduled by the DCI based on QCL information of a CORESET with a lower ID among a first CORESET associated with the first search space and a second CORESET associated with the second search space, in case that the DCI does not include a TCI field and a time offset between a reception of the DCI and the PDSCH is greater than or equal to a threshold.

8 Claims, 2 Drawing Sheets

(30) Foreign Application Priority Data

Jan. 15, 2021 (IN) .............................. 202141002011
Oct. 29, 2021 (IN) .............................. 202041050559

(56) References Cited

U.S. PATENT DOCUMENTS

2019/0253308 A1  8/2019  Huang et al.
2019/0281587 A1  9/2019  Zhang et al.
2020/0153572 A1  5/2020  Tsai et al.

FOREIGN PATENT DOCUMENTS

WO   WO 2019/216640   11/2019
WO   WO 2020/162735    8/2020
WO   WO 2020/231182   11/2020

OTHER PUBLICATIONS

Samsung, "On Rel. 16 Multi-TRP/Panel Transmission", R1-2008141, 3GPP TSG RAN WG1#103-e, Oct. 26-Nov. 13, 2020, 8 pages.
International Search Report dated Feb. 23, 2022 issued in counterpart application No. PCT/KR2021/017090, 6 pages.
Indian Examination Report dated Sep. 28, 2022 issued in counterpart application No. 202041050559, 5 pages.

* cited by examiner

METHOD AND UE FOR DETERMINING DEFAULT BEAM BEHAVIOR IN WIRELESS NETWORK

CROSS-REFERENCE TO RELATED APPLICATION(S)

This application is a Continuation of U.S. patent application Ser. No. 17/531,041, which was filed in the U.S. Patent and Trademark Office on Nov. 19, 2021, and is based on and claims priority under 35 U.S.C. § 119(a) to Indian Provisional Patent Application No. 202041050559, filed in the Indian Patent Office on Nov. 20, 2020, Indian Provisional Patent Application No. 202141001630, filed in the Indian Patent Office on Jan. 13, 2021, Indian Provisional Patent Application No. 202141002011, filed in the Indian Patent Office on Jan. 15, 2021, and Indian Non-Provisional Patent Application No. 202041050559, filed in the Indian Patent Office on Oct. 29, 2021, the entire disclosure of each of which is incorporated herein by reference.

BACKGROUND

1. Field

The disclosure relates generally to wireless communication, and more specifically, to a method and a user equipment (UE) for determining default beam behavior of a physical downlink shared channel (PDSCH) and/or a physical downlink control channel (PDCCH) for further enhanced multiple input multiple output (FeMIMO) in a wireless network.

2. Description of Related Art

To meet the increasing demand for wireless data traffic since deployment of 4th generation (4G) communication systems, efforts have been made to develop an improved 5th generation (5G) or pre-5G communication system. The 5G or pre-5G communication system may also be referred to as a 'beyond 4G network' or a 'post long term evolution (LTE) System'.

The 5G communication system is intended to be implemented in higher frequency (mmWave) bands, e.g., 60 GHz bands, to accomplish higher data rates. To decrease propagation loss of the radio waves and increase the transmission distance, beamforming, massive multiple-input multiple-output (MIMO), full dimensional-MIMO (FD-MIMO), array antenna, an analog beam forming, large scale antenna techniques are being discussed for use in 5G communication systems.

In addition, in 5G communication systems, system network improvement is under way based on advanced small cells, cloud radio access networks (RANs), ultra-dense networks, device-to-device (D2D) communication, wireless backhaul, moving networks, cooperative communication, coordinated multi-points (CoMP), reception-end interference cancellation, etc.

In the 5G system, hybrid frequency-shift keying (FSK) and quadrature amplitude modulation (QAM) (FQAM) and sliding window superposition coding (SWSC) have been developed for an advanced coding modulation (ACM), and filter bank multi carrier (FBMC), non-orthogonal multiple access (NOMA), and sparse code multiple access (SCMA) have been developed as advanced access technologies.

To further enhance existing 5G new radio (NR), control channel transmissions are being redesigned for better reliability and performance. One such enhancement is multi transmit receive point (mTRP) based enhancement of a PDCCH and/or a PDSCH. The enhancement focuses on improving reliability of the PDCCH by transmitting from different TRP(s) in different ways (e.g., time division multiplexing (TDM)/frequency division multiplexing (FDM)/ spatial division multiplexing (SDM). A default beam behavior defined in the existing 5G-NR specification is inapplicable for scenarios with an enhanced mTRP PDCCH and an enhanced mTRP PDSCH. Further, a configuration of a control resource set (CORESET), the PDCCH, and the PDSCH are enhanced to accommodate different TRP(s), the default beam behavior defined in the existing 5G-NR specification for the PDCCH and/or the PDSCH needs to be modified.

Thus, it is desired to provide a useful alternative for determining the default beam behavior of the PDSCH and/or the PDCCH for FeMIMO in a wireless network.

SUMMARY

An aspect of the disclosure is to provide a method and an UE for determining default beam behavior of a PDSCH for FeMIMO. The default beam behavior of the PDSCH may be defined as a quasi-co-location (QCL) assumption to be made for a reception of the PDSCH and decoding whenever a transmission configuration indication (TCI) indication of the PDSCH is not available or not applicable.

Another aspect of the disclosure is to provide a method that considers a specific set of schemes used for an mTRP PDCCH enhancement and proposes different behavior of the UE towards the default beam consideration of the PDSCH in different scenarios.

Another aspect of the disclosure is to provide a method for determining a default beam behavior of a PDCCH for FeMIMO, e.g., by considering two schemes used for the mTRP PDCCH enhancement.

Another aspect of the disclosure is to provide a method that proposes different behavior of the UE towards the default beam consideration of the PDCCH in different scenarios.

Another aspect of the disclosure is to provide a method that determines a default beam behavior of a PDSCH for a single frequency network (SFN).

Another aspect of the disclosure is to provide a method that focuses on improving a reliability of the PDCCH by repeating from different TRPs over same time and frequency resources defined as the SFN.

Another aspect of the disclosure is to provide a method that considers SFN based mTRP PDCCH enhancement by using a specific set of schemes and proposes different behavior of the UE towards the default beam consideration of the PDSCH in different scenarios.

In accordance with an aspect of the disclosure, a method is provided for a UE in a wireless network. The method includes receiving, in a first search space and a second search space that are linked for PDCCH repetition, at least one PDCCH including DCI; and receiving a PDSCH scheduled by the DCI based on QCL information of a CORESET with a lower ID among a first CORESET associated with the first search space and a second CORESET associated with the second search space, in case that the DCI does not include a TCI field and a time offset between a reception of the DCI and the PDSCH is greater than or equal to a threshold.

In accordance with another aspect of the disclosure, a UE is provided for use in a wireless network. The UE includes a communicator; and a controller operably connected to the communicator and configured to receive, in a first search space and a second search space that are linked for PDCCH repetition, at least one PDCCH including DCI, and receive a PDSCH scheduled by the DCI based on QCL information of a CORESET with a lower ID among a first CORESET associated with the first search space and a second CORESET associated with the second search space, in case that the DCI does not include a TCI field and a time offset between a reception of the DCI and the PDSCH is greater than or equal to a threshold.

BRIEF DESCRIPTION OF FIGURES

The above and other aspects, features, and advantages of certain embodiments of the disclosure will be more apparent from the following detailed description taken in conjunction with the accompanying drawings, in which.

DETAILED DESCRIPTION OF INVENTION

Figure 1:
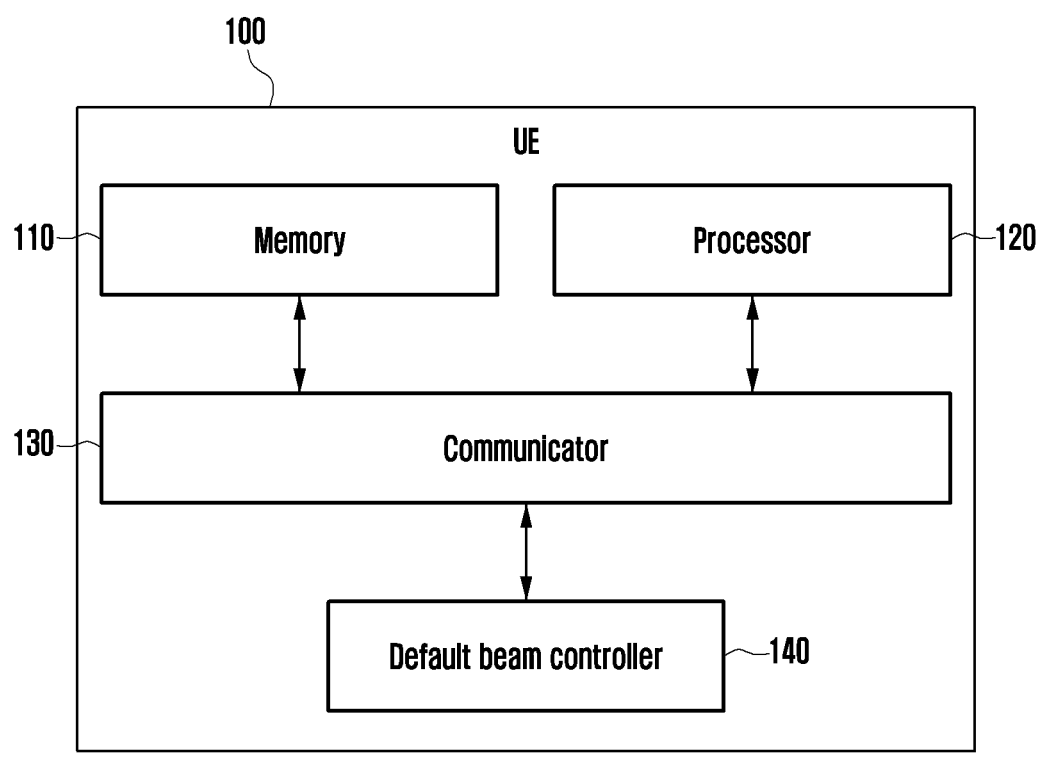
FIG. 1 illustrates a UE for determining default beam behavior in a wireless network, according to an embodiment.

Various embodiments of the disclosure will now be described in detail with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

The term "or" as used herein, refers to a non-exclusive or, unless otherwise indicated.

As is traditional in the field, embodiments may be described and illustrated in terms of blocks that carry out a described function or functions. These blocks, which may be referred to herein as managers, units, modules, hardware components, etc., may be physically implemented by analog and/or digital circuits such as logic gates, integrated circuits, microprocessors, microcontrollers, memory circuits, passive electronic components, active electronic components, optical components, hardwired circuits, etc., and may optionally be driven by firmware. The circuits may be embodied in one or more semiconductor chips, or on substrate supports such as printed circuit boards (PCBs) and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings.

Although the terms first, second, etc. may be used herein to describe various elements, these elements should not be limited by these terms. These terms are generally only used to distinguish one element from another.

According to an embodiment, a method is provided for determining default beam behavior in a wireless network. The method includes receiving, by a UE, PDCCH information from a network entity, where the PDCCH information includes DCI and PDSCH information. The method further includes determining, by the UE, whether a TCI state is not present in the DCI. The method further includes determining, by the UE, whether a scheduling offset between reception of all transmission occasions of DL DCI and corresponding PDSCH information of a serving cell is greater than or equal to a threshold. The method further includes determining, by the UE, the default beam behavior based on a CORESET with a lower ID among first and second CORESETs, in response to determining that the TC state is not present in the DCI and the scheduling offset between reception of all transmission occasions of the DL DCI and the corresponding PDSCH information of the serving cell is greater than or equal to the threshold.

According to an embodiment, a UE is provided for determining default beam behavior in a wireless network. The UE includes a default beam controller coupled with a processor and a memory. The default beam controller receives PDCCH information from a network entity, where the PDCCH information includes DCI and PDSCH information. The default beam controller determines a TCI state is not present in the DCI. The default beam controller determines whether a scheduling offset between reception of all transmission occasions of DL DCI and corresponding PDSCH information of the serving cell is greater than or equal to a threshold. The default beam controller determines the default beam behavior based on a CORESET with a lowest ID among first and second CORESETs, in response to determining that the TCI state is not present in the DCI and the scheduling offset between reception of all transmission occasions of the DL DCI and the corresponding PDSCH information of the serving cell is greater than or equal to the threshold.

Unlike existing methods and systems, a method according to an embodiment of the disclosure allows a UE to determine default beam behavior of a PDSCH for FeMIMO. The default beam behavior of the PDSCH may be defined as a QCL assumption to be made for a reception of the PDSCH and decoding is performed whenever TC indication of the PDSCH is not available or not applicable. Further, the method considers a specific set of schemes used for an mTRP PDCCH enhancement and proposes different behavior of the UE towards the default beam consideration of the PDSCH in different scenarios.

Unlike existing methods and systems, a method according to an embodiment of the disclosure allows a UE to determine default beam behavior of a PDCCH for FeMIMO. Further, the method considers two schemes used for the mTRP PDCCH enhancement, and proposes different behavior of the UE towards the default beam consideration of the PDCCH in different scenarios.

Unlike existing methods and systems, a method according to an embodiment of the disclosure allows a UE to determine default beam behavior of a PDSCH for a single frequency network. Further, the method improves reliability of a PDCCH by repeating from different TRPs over same time and frequency resources defined as an SFN. Further, the method considers SFN based mTRP PDCCH enhancement by using a specific set of schemes and proposes different behavior of the UE towards the default beam consideration of the PDSCH in different scenarios.

FIG. 1 illustrates a UE for determining default beam behavior in a wireless network, according to an embodiment. Examples of the UE 100 include, but are not limited to a smartphone, a tablet computer, a personal digital assistant (PDA), an Internet of things (IoT) device, a wearable device, etc.

Referring to FIG. 1, the UE 100 includes a memory 110, a processor 120, a communicator 130, and a default beam controller 140.

The memory 110 stores PDCCH information, DCI, and PDSCH information. The memory 110 stores instructions to be executed by the processor 120. The memory 110 may include non-volatile storage elements. Examples of such non-volatile storage elements may include magnetic hard discs, optical discs, floppy discs, flash memories, and/or forms of electrically programmable memories (EPROM) or electrically erasable and programmable (EEPROM) memories. In addition, the memory 110 may be considered a non-transitory storage medium. Herein, the term "non-transitory" may indicate that the storage medium is not embodied in a carrier wave or a propagated signal. However, the term "non-transitory" should not be interpreted that the memory 110 is non-movable. A non-transitory storage medium may store data that can, over time, change (e.g., in random access memory (RAM) or cache). The memory 110 can be an internal storage unit or it can be an external storage unit of the UE 100, a cloud storage, or any other type of external storage.

The processor 120 communicates with the memory 110, the communicator 130, and the default beam controller 140. The processor 120 is configured to execute instructions stored in the memory 110 and to perform various processes. The processor 120 may include one or a plurality of processors, maybe a general-purpose processor, such as a central processing unit (CPU), an application processor (AP), etc., a graphics-only processing unit such as a graphics processing unit (GPU), a visual processing unit (VPU), and/or an artificial intelligence (AI) dedicated processor such as a neural processing unit (NPU).

The communicator 130 is configured for communicating internally between internal hardware components and with external devices (e.g., an evolved universal mobile telecommunications service (UMTS) terrestrial radio access network (E-UTRAN) Node B (eNodeB), a gNodeB, a server, a network entity, etc.) via one or more networks (e.g., radio technology). The communicator 130 includes an electronic circuit specific to a standard that enables wired or wireless communication.

The default beam controller 140 is implemented by processing circuitry such as logic gates, integrated circuits, microprocessors, microcontrollers, memory circuits, passive electronic components, active electronic components, optical components, hardwired circuits, etc., and may optionally be driven by firmware. The circuits may be embodied in one or more semiconductor chips, or on substrate supports such as PCBs and the like.

The default beam controller 140 receives the PDCCH information from the network entity (e.g. eNodeB, gNodeB, etc.), where the PDCCH information includes the DCI and PDSCH information. The default beam controller 140 determines whether a TCI state is not present in the DCI. The default beam controller 140 determines whether a scheduling offset between reception of all transmission occasions of DL DCI and corresponding PDSCH information of a serving cell is greater than or equal to a threshold (i.e. timeDurationForQCL). Further, the default beam controller 140 determines the default beam behavior based on a CORESET with a lowest ID among first and second CORESETs, in response to determining that the TCI state is not present in the DCI and the scheduling offset between reception of all transmission occasions of the DL DCI and the corresponding PDSCH information of the serving cell is greater than or equal to the threshold.

The default beam behavior is determined for the PDCCH information and/or the PDSCH information for an SFN and/or a non-SFN.

The PDCCH information includes a search space, and the search space is associated with a respective CORESET with a different TCI state corresponding to a plurality of QCL parameters.

The PDCCH information is transmitted over multiple transmission occasions from each TRP using TDM and/or FDM.

The default beam behavior of the PDSCH information is defined as a QCL assumption to be made for the reception of the PDSCH information and the PDCCH information is decoded whenever the TCI state is not available or applicable.

The channel estimation over the PDCCH information is performed by the UE 100 using a DMRS port considering the plurality of QCL parameters over each transmission occasion with respect to the TCI states.

The default beam behavior of the PDCCH information is determined based on a CORESET with a lowest CORESET ID, a CORESET with a highest CORESET ID, a first CORESET, a last CORESET, a CORESET allocated with a lowest starting PRB index, and/or a CORESET allocated with a highest starting PRB index.

Schemes considered for mTRP PDSCH as a part of the method can be categorized as SFN schemes and non-SFN schemes.

SFN Scheme

An environment is defined in an SFN scheme as follows.

The CORESET used for the PDCCH transmission is configured with more than one TCI state corresponding to the different QCL parameters, where each PDCCH candidate of a monitored search space maps to one or more TCI states. Similarly, the PDCCH information is transmitted over the same time-frequency resource from each TRP. Upon reception of the PDCCH occasion, the UE 100 performs channel estimation over the PDCCH DMRS port considering a combined QCL parameter with respect to the configured TCI states.

Each scenario in which the default beam is considered is defined by a set of conditions being satisfied, on which the respective behavior (e.g., a PDSCH default beam behavior) of the UE 100 is applicable. For each behavior, multiple solutions are proposed for which one or more solutions are applied for the respective scenario(s).

I. A set of conditions for a first scenario is given below:
   a. If the PDSCH is scheduled by the DCI format not having the TCI field present.

b. The time offset between the receptions of the DL DCI of the serving cell is greater than or equal to a threshold timeDurationForQCL.
c. The CORESET used for the PDCCH transmission is configured with more than one TCI state.
d. The PDCCH transmission scheduling the PDSCH is configured with the SFN scheme.

If the set of the conditions for the first scenario are satisfied, then the UE 100 assumes that the TCI state or the QCL assumption for the PDSCH is identical to the TCI state with a lowest TCI state ID applied for the CORESET, a highest TCI state ID applied for the CORESET, a first TC state ID applied for the CORESET, or a last TCI state ID applied for the CORESET is used for the PDCCH transmission within a serving cell's active bandwidth part (BWP).

II. A set of conditions for a second scenario is given below:
a. Independent of the configuration of a tci-PresentInDCI and a tci-PresentForDCI-Format1-2-r16 in a radio resource control (RRC) connected mode, if the time offset between the DL DCI and the corresponding PDSCH is less than the threshold timeDurationForQCL.
b. One or more configured TCI state for the serving cell of scheduled PDSCH contains 'QCL-Type D'.
c. The PDCCH transmission scheduling the PDSCH is configured with an SFN scheme.
d. The PDCCH QCL indication of the CORESET associated with the monitored search space maps to multiple TCI states.

If the set of the conditions for the second scenario are satisfied, then the UE 100 assumes that the DM-RS ports of the PDSCH of the serving cell are QCLed with a reference signal (or RSs) with respect to the QCL parameter (or parameters) corresponding to, one of, the lowest TCI state ID, the highest TCI state ID, the first TCI state ID, or the last TCI state ID used for the PDCCH QCL indication of the CORESET associated with the monitored search space with the lowest controlResourceSetId or used for the PDCCH QCL indication of the CORESET associated with the monitored search space with the lowest controlResourceSetId and configured with a single TCI state in a latest slot in which one or more CORESETs within the active BWP of the serving cell are monitored by the UE 100.

III. A set of conditions for a third scenario is given below:
a. Independent of the configuration of the tci-PresentInDCI and the tci-PresentForDCI-Format1-2-r16 in the RRC connected mode, if the time offset between the DL DCI and the corresponding PDSCH is less than the threshold timeDurationForQCL.
b. One or more configured TCI states for the serving cell of scheduled PDSCH contains the 'QCL-TypeD'.
c. The PDCCH transmission scheduling the PDSCH is configured with an SFN scheme.
d. The PDCCH QCL indication of the CORESET associated with the monitored search space maps to multiple TCI states.
e. If the UE 100 is configured with enablingdefaultTCIstateper CoresetPoolIndex-r16.
f. The UE 100 is configured by higher layer parameter PDCCH-Configure that contains two different values of the CORESETPoolIndex in different ControlResourceSets.

If the set of the conditions for the third scenario are satisfied, then the UE 100 assumes that the DM-RS ports of PDSCH associated with a value of CORESETPoolIndex of the serving cell are QCLed with the RS(s) with respect to the QCL parameter(s) corresponding to, one of, the lowest TCI state ID, the highest TCI state ID, the first TCI state ID, or the last TCI state ID used for the PDCCH quasi co-location indication of the CORESET associated with the monitored search space with the lowest controlResourceSetId or used for the PDCCH quasi co-location indication of the CORESET associated with the monitored search space with the lowest controlResourceSetId and configured with the single TCI state which are configured with the same value of the CORESETPoolIndex as the PDCCH scheduling that PDSCH, in the latest slot in which one or more CORESETs associated with the same value of the CORESETPoolIndex as the PDCCH scheduling that PDSCH within the active BWP of the serving cell are monitored by the UE 100.

Non-SFN Scheme-1

An environment is defined in the non-SFN scheme-1 as follows.

The CORESET used for the PDCCH transmission is configured with more than one TCI state corresponding to the different QCL parameters, where each PDCCH candidate of the monitored search space maps to the different TCI state. The same PDCCH information is transmitted over multiple transmission occasions from each TRP in different time resources using TDM or in different frequency resources using FDM.

Upon reception of the PDCCH occasions from different PDCCH candidates, the UE 100 performs channel estimation over the PDCCH DMRS port considering the different QCL parameters over each occasion, with respect to the configured TCI states.

The default beam behavior of the PDSCH may be defined as the QCL assumption to be made for PDSCH reception and decoding is performed whenever the PDSCH TCI indication is not available or applicable.

Each scenario in which the default beam is considered is defined by a set of conditions being satisfied, on which the respective behavior is applicable. For each behavior, multiple solutions are proposed of which one or more solution is applied for the respective scenario(s).

I. A set of conditions for a first scenario for the non-SFN scheme-1 is given below:
a. The PDCCH transmission scheduling the PDSCH is configured with the non-SFN scheme-1.
b. The CORESET used for the PDCCH transmission is configured with more than one TCI state mapping to different PDCCH candidates.

If the set of the conditions for the first scenario for non-SFN scheme-1 are satisfied, then the UE 100 expects the same DL DCI transmitted over more than one PDCCH candidate in the monitored search space of the CORESET. Further, the UE 100 expects the time offset between all the transmission occasions of the DL DCI scheduling the same PDSCH and the corresponding PDSCH of the serving cell is greater than or equal to the threshold timeDurationForQCL. In a different embodiment, the UE 100 expects the time offset between all the transmission occasions of the DL DCI scheduling the same PDSCH and the corresponding PDSCH of the serving cell is lesser than the threshold timeDurationForQCL.

II. A set of conditions for a second scenario for the non-SFN scheme-1 is given below:
a. If the PDSCH is scheduled by the DCI format not having the TCI field present.
b. The time offset between the reception of all the transmission occasions of the DL DCI and the corresponding PDSCH of the serving cell is greater than or equal to the threshold timeDurationForQCL.

c. The CORESET used for the PDCCH transmission is configured with more than one TCI state mapping to different PDCCH candidates.
d. The PDCCH transmission scheduling the PDSCH is configured with the non-SFN scheme-1.

If the set of the conditions for the second scenario for the non-SFN scheme-1 are satisfied, then the UE 100 assumes that the TCI state or the QCL assumption for the PDSCH is identical to the TCI state of the lowest TCI state ID applied for the CORESET, the highest TCI state ID applied for the CORESET, the first TCI state ID applied for the CORESET, the last TCI state ID applied for the CORESET, the first transmission occasion in the CORESET, the last transmission occasion in the CORESET, the first PDCCH candidate linked with the PDCCH transmission in the CORESET, the last PDCCH candidate linked with the PDCCH transmission in the CORESET, the lowest starting PRB index allocated to the CORESET, or the highest starting PRB index allocated to the CORESET used for the PDCCH transmission within the active BWP of the serving cell.

When the UE 100 is configured with CORESET associated with a search space set for cross-carrier scheduling, the UE 100 is not configured with an enableDefaultBeamForCCSS, and if one or more of the TCI states configured for the serving cell scheduled by the search space set contains 'QCL-TypeD' and the PDCCH transmission scheduling the PDSCH is configured with the non-SFN scheme-1, then the UE 100 expects the tci-PresentInDCI is set as 'enabled' or the tci-PresentForDCI-Format1-2-r16 is configured for the CORESET or the UE 100 expects the time offset between the reception of all the transmission occasions of the DL DCI and the corresponding PDSCH is greater than or equal to the threshold timeDurationForQCL.

III. A set of conditions for a third scenario for the non-SFN scheme-1 is given below:
a. Independent of the configuration of the tci-PresentInDCI and the tci-PresentForDCI-Format1-2-r16 in the RRC connected mode, if the offset between all the transmission occasions of the DL DCI and the corresponding PDSCH is less than the threshold timeDurationForQCL.
b. One or more configured TCI states for the serving cell of scheduled PDSCH contains the 'QCL-TypeD'.
c. The PDCCH transmission scheduling the PDSCH is configured with the non-SFN scheme-1.
d. The PDCCH QCL indication of the CORESET associated with the monitored search space maps the different TCI states to the different PDCCH candidates of the CORESET.

If the set of the conditions for the third scenario for the non-SFN scheme-1 are satisfied, then the UE 100 assumes that the DM-RS ports of PDSCH of the serving cell are QCLed with the RS(s) with respect to the QCL parameter(s) corresponding to the lowest TCI state ID, the highest TCI state ID or the first TCI state ID, or the last TCI state ID used for PDCCH QCL indication of the CORESET associated with the monitored search space with the lowest controlResourceSetId or used for PDCCH QCL indication of the CORESET associated with the monitored search space with the lowest controlResourceSetId and configured with the single TCI state in the latest slot in which one or more CORESETs within the active BWP of the serving cell are monitored by the UE 100.

IV. A set of conditions for a fourth scenario for the non-SFN scheme-1 is given below:
a. Independent of the configuration of the tci-PresentInDCI and the tci-PresentForDCI-Format1-2-r16 in the RRC connected mode, if the offset between all the transmission occasions of the DL DCI and the corresponding PDSCH is less than the threshold timeDurationForQCL.
b. One or more configured TCI states for the serving cell of scheduled PDSCH contains the 'QCL-TypeD'.
c. The PDCCH transmission scheduling the PDSCH is configured with the non-SFN scheme-1.
d. The PDCCH QCL indication of the CORESET associated with the monitored search space maps different TCI states to different PDCCH candidates of the CORESET.
e. If the UE 100 is configured with the enableDefaultTCIStatePerCoresetPoolIndex-r16.
f. The UE 100 is configured by the higher layer parameter PDCCH-Configure that contains two different values of CORESETPoolIndex in different ControlResourceSets.

If the set of the conditions for the fourth scenario for the non-SFN scheme-1 are satisfied, then the UE 100 assumes that the DM-RS ports of the PDSCH associated with the value of CORESETPoolIndex of the serving cell are QCLed with the RS(s) with respect to the QCL parameter(s) corresponding to the lowest TCI state ID, the highest TCI state ID, the first TCI state ID, or the last TCI state ID for PDCCH QCL indication of the CORESET associated with the monitored search space with the lowest controlResourceSetId or used for the PDCCH QCL indication of the CORESET associated with the monitored search space with the lowest controlResourceSetId and configured with the single TCI state, which are configured with the same value of CORESETPoolIndex as the PDCCH scheduling that PDSCH in the latest slot in which one or more CORESETs associated with the same value of CORESETPoolIndex as the PDCCH scheduling that PDSCH within the active BWP of the serving cell are monitored by the UE 100.

Non-SFN Scheme-2

An environment is defined in the non-SFN scheme-2 as follows.

The CORESET used for the PDCCH transmission is configured with more than one TCI state corresponding to different QCL parameters, where different search spaces are configured to the CORESET maps to different TCI states. The same PDCCH information is transmitted over the multiple transmission occasions from each TRP in different time resources using TDM or in different frequency resources using FDM. Upon reception of the PDCCH occasions from different search spaces, the UE 100 performs the channel estimation over the PDCCH DMRS port considering the different QCL parameters over each occasion, with respect to the configured TC states.

The default beam behavior of PDSCH may be defined as the QCL assumption to be made for the PDSCH reception and decoding whenever the PDSCH TCI indication is not available or applicable.

Each scenario in which the default beam is considered is defined by a set of conditions being satisfied, on which the respective behavior is applicable. For each behavior multiple solutions are proposed of which one or more solutions are applied for the respective scenario(s).

I. A set of conditions for a first scenario for the non-SFN scheme-2 is given below:
a. The CORESET used for the PDCCH transmission is configured with more than one TCI state mapping to different search spaces.
b. The PDCCH transmission scheduling the PDSCH is configured with the non-SFN scheme-2.

If the set of the conditions for the first scenario for the non-SFN scheme-2 are satisfied, then the UE 100 expects the same DL DCI transmitted over more than one search space configured to the CORESET. Further, the UE 100 expects the time offset between all the transmission occasions of the DL DCI scheduling the same PDSCH and the corresponding PDSCH of the serving cell is greater than or equal to the threshold timeDurationForQCL. In a different embodiment, the UE 100 expects the time offset between all the transmission occasions of the DL DCI scheduling the same PDSCH and the corresponding PDSCH of the serving cell is lesser than the threshold timeDurationForQCL.

II. A set of conditions for a second scenario for the non-SFN scheme-2 is given below:
  a. If the PDSCH is scheduled by the DCI format not having the TCI field present.
  b. The time offset between the reception of all the transmission occasions of the DL DCI and the corresponding PDSCH of the serving cell is greater than or equal to the threshold timeDurationForQCL.
  c. The CORESET used for the PDCCH transmission is configured with more than one TCI state mapping to the different search spaces.
  D. The PDCCH transmission scheduling the PDSCH is configured with the non-SFN scheme-2.

If the set of the conditions for the second scenario for the non-SFN scheme-2 are satisfied, then the UE 100 assumes that the TCI state or the QCL assumption for the PDSCH is identical to the TCI state of the lowest TCI state ID, the highest TCI state ID, the first TCI state ID, or the last TCI state ID applied for the CORESET used for the PDCCH transmission within the active BWP of the serving cell. Further, the UE 100 assumes that the TCI state or the QCL assumption for the PDSCH is identical to the TCI state of the first search space, the last search space or the search space with the lowest search space ID, or the search space with the highest search space ID monitored for the PDCCH transmission occasion in the CORESET. Further, the UE 100 assumes that the TCI state or the QCL assumption for the PDSCH is identical to the TCI state of the search space with the lowest starting PRB index allocated in the CORESET or the search space with the highest starting PRB index allocated in the CORESET used for the PDCCH transmission within the active BWP of the serving cell.

III. A set of conditions for a third scenario for the non-SFN scheme-2 is given below:
  a. When the UE 100 is configured with CORESET associated with the search space set for cross-carrier scheduling.
  b. The UE 100 is not configured with the enableDefaultBeamForCCSS.
  c. If one or more of the TCI states configured for the serving cell scheduled by the search space set contains 'QCL-TypeD'.
  d. The PDCCH transmission scheduling the PDSCH is configured with the non-SFN scheme-2.

If the set of the conditions for the third scenario for the non-SFN scheme-2 are satisfied, then the UE 100 expects the tci-PresentInDCI is set as 'enabled' or the tci-PresentForDCI-Format1-2-r16 is configured for the CORESET. Further, the UE 100 expects the time offset between the reception of all the transmission occasions of the DL DCI and the corresponding PDSCH is greater than or equal to the threshold timeDurationForQCL.

IV. A set of conditions for a fourth scenario for the non-SFN scheme-2 is given below:
  a. Independent of the configuration of the tci-PresentInDCI and the tci-PresentForDCI-Format1-2-r16 in the RRC connected mode, if the offset between all the transmission occasions of the DL DCI and the corresponding PDSCH is less than the threshold timeDurationForQCL.
  b. One or more configured TCI states for the serving cell of scheduled PDSCH contains the 'QCL-TypeD'.
  c. The PDCCH transmission scheduling the PDSCH is configured with the non-SFN scheme-2.
  d. The PDCCH QCL indication of the CORESET associated with the monitored search space maps different TCI states to different search spaces assigned to the CORESET.

If the set of the conditions for the fourth scenario for the non-SFN scheme-2 are satisfied, then the UE 100 assumes that the DM-RS ports of PDSCH of the serving cell are QCLed with the RS(s) with respect to the QCL parameter(s) corresponding to the lowest TCI state ID, the highest TCI state ID or the first TCI state ID, or the last TCI state ID used for the PDCCH QCL indication of the CORESET associated with the monitored search space with the lowest controlResourceSetId in the latest slot in which one or more CORESETs within the active BWP of the serving cell are monitored by the UE 100. Further, the UE 100 assumes that the DM-RS ports of PDSCH of the serving cell are QCLed with the RS(s) with respect to the QCL parameter(s) used for PDCCH QCL indication of the CORESET associated with the monitored search space with the lowest controlResourceSetId and configured with the single TCI state in the latest slot in which one or more CORESETs within the active BWP of the serving cell are monitored by the UE 100.

V. A set of conditions for a fifth scenario for the non-SFN scheme-2 is given below:
  a. Independent of the configuration of the tci-PresentInDCI and the tci-PresentForDCI-Format1-2-r16 in the RRC connected mode, if the offset between all the transmission occasions of the DL DCI and the corresponding PDSCH is less than the threshold timeDurationForQCL.
  b. One or more configured TCI states for the serving cell of scheduled PDSCH contains the 'QCL-TypeD'.
  c. The PDCCH transmission scheduling the PDSCH is configured with the non-SFN scheme-2.
  d. The PDCCH quasi co-location indication of the CORESET associated with the monitored search space maps the different TCI states to the different search spaces assigned to the CORESET.
  e. If the UE 100 is configured with the enableDefaultTCIStatePerCoresetPoolIndex-r16.
  f. The UE 100 is configured by higher layer parameter of the PDCCH-Configure that contains two different values of the CORESETPoolIndex in different ControlResourceSets.

If the set of the conditions for the fifth scenario for the non-SFN scheme-2 are satisfied, then the UE 100 assumes that the DM-RS ports of PDSCH associated with the value of CORESETPoolIndex of the serving cell are QCLed with the RS(s) with respect to the QCL parameter(s) corresponding to the lowest TC state ID, the highest TCI state ID, the first TCI state ID, or the last TCI state ID used for the PDCCH QCL indication of the CORESET associated with the monitored search space with the lowest controlResourceSetId. Further, the UE 100 assumes that the DM-RS ports of PDSCH associated with the value of CORESETPoolIndex of the serving cell are QCLed with the RS(s) with respect to the QCL parameter(s) used for the PDCCH QCL indication of the CORESET associated with the monitored search space with the lowest controlResourceSetId and configured with the single TCI state, which is configured with the same value of CORESETPoolIndex as the PDCCH scheduling that PDSCH, in the latest slot in which are one or more CORESETs associated with the same value of CORESETPoolIndex as the PDCCH scheduling that PDSCH within the active BWP of the serving cell are monitored by the UE 100.

Non-SFN Scheme-3

An environment is defined in the non-SFN scheme-3 as follows.

The monitored search space for the PDCCH transmission is associated with more than one CORESET each configured with the different TCI states corresponding to the different QCL parameters. The same PDCCH information is transmitted over the multiple transmission occasions from each TRP in the different time resources using TDM or in the different frequency resources using FDM. Upon reception of the PDCCH occasions from different CORESETs, the UE 100 performs channel estimation over the PDCCH DMRS port considering the different QCL parameters over each occasion, with respect to the configured TCI states.

The default beam behavior of PDSCH may be defined as the QCL assumption to be made for the PDSCH reception and decoding is performed whenever the PDSCH TCI indication is not available or applicable.

Each scenario in which the default beam is considered is defined by a set of conditions being satisfied, on which the respective behavior is applicable. For each behavior multiple solutions are proposed of which one or more solutions are applied for the respective scenario(s).

I. A set of conditions for a first scenario for the non-SFN scheme-3 is given below:
 a. The search space containing the PDCCH transmission is associated with more than one CORESET each with different TCI states.
 b. The PDCCH transmission scheduling the PDSCH is configured with the non-SFN scheme-3.

If the set of the conditions for the first scenario for the non-SFN scheme-3 are satisfied, then the UE 100 expects the same DL DCI transmitted over more than one CORESET associated with the monitored search space used for the PDCCH transmission. Further, the UE 100 expects the time offset between all the transmission occasions of the DL DCI scheduling the same PDSCH and the corresponding PDSCH of a serving cell is greater than or equal to the threshold timeDurationForQCL. In a different embodiment, the UE 100 expects the time offset between all the transmission occasions of the DL DCI scheduling the same PDSCH and the corresponding PDSCH of a serving cell is lesser than the threshold timeDurationForQCL.

II. A set of conditions for a second scenario for the non-SFN scheme-3 is given below:
 a. If the PDSCH is scheduled by the DCI format not having the TCI field present.
 b. The time offset between the reception of all the transmission occasions of the DL DCI and the corresponding PDSCH of the serving cell is greater than or equal to the threshold timeDurationForQCL.
 c. The search space containing the PDCCH transmission is associated with more than one CORESET each with different TCI states.
 d. The PDCCH transmission scheduling the PDSCH is configured with the non-SFN scheme-3.

If the set of the conditions for the second scenario for the non-SFN scheme-3 are satisfied, then the UE 100 assumes that the TCI state or the QCL assumption for the PDSCH is identical to the TCI state of the CORESET with the lowest ControlResourceSetID, the highest ControlResourceSetID, the first CORESET, or the last CORESET associated with the monitored search space used for the PDCCH transmission within the active BWP of the serving cell. Further, the UE 100 assumes that the TCI state or the QCL assumption for the PDSCH is identical to the TCI state of the CORESET allocated with the lowest starting PRB index or the highest starting PRB index associated with the monitored search space used for the PDCCH transmission within the active BWP of the serving cell.

III. A set of conditions for a third scenario for the non-SFN scheme-3 is given below:
 a. When the UE 100 is configured with the CORESET associated with the search space set for cross-carrier scheduling.
 b. The UE 100 is not configured with the enableDefaultBeamForCCSS.
 c. If one or more of the TCI states are configured for the serving cell scheduled by the search space set contains 'QCL-TypeD'.
 d. The PDCCH transmission scheduling the PDSCH is configured with the non-SFN scheme-3.

If the set of the conditions for the third scenario for the non-SFN scheme-3 are satisfied, then the UE 100 expects the tci-PresentInDCI is set as 'enabled' or the tci-PresentForDCI-Format1-2-r16 is configured for the CORESET. Further, the UE 100 expects the time offset between the reception of all the transmission occasions of the DL DCI and the corresponding PDSCH is greater than or equal to the threshold timeDurationForQCL.

IV. A set of conditions for a fourth scenario for the non-SFN scheme-3 is given below:
 a. Independent of the configuration of the tci-PresentInDCI and the tci-PresentForDCI-Format1-2-r16 in the RRC connected mode, if the offset between all the transmission occasions of the DL DCI and the corresponding PDSCH is less than the threshold timeDurationForQCL
 b. One or more configured TCI states for the serving cell of scheduled PDSCH contains the 'QCL-TypeD'.
 c. The PDCCH transmission scheduling the PDSCH is configured with the non-SFN scheme-3.
 d. The monitored search space for the PDCCH transmission maps to multiple CORESETs with different TCI states.

If the set of the conditions for the fourth scenario for the non-SFN scheme-3 are satisfied, then the UE 100 assumes that the DM-RS ports of PDSCH of the serving cell are QCLed with the RS(s) with respect to the QCL parameter(s) used for PDCCH QCL indication of the CORESET associated with the monitored search space with the lowest controlResourceSetId or the highest controlResourceSetId in the latest slot in which one or more CORESETs within the active BWP of the serving cell are monitored by the UE 100.

Further, the UE 100 assumes that the DM-RS ports of PDSCH of a serving cell are QCLed with the RS(s) with respect to the QCL parameter(s) used for PDCCH QCL indication of the first CORESET or the last CORESET associated with the monitored search space in the latest slot in which one or more CORESETs within the active BWP of the serving cell are monitored by the UE 100.

Further, the UE 100 assumes that the DM-RS ports of the PDSCH of the serving cell are QCLed with the RS(s) with respect to the QCL parameter(s) used for the PDCCH QCL indication of the CORESET associated with the monitored search space with the lowest controlResourceSetId and configured with the single TCI state in the latest slot in which one or more CORESETs within the active BWP of the serving cell are monitored by the UE 100.

V. A set of conditions for a fifth scenario for the non-SFN scheme-3 is given below:
  a. Independent of the configuration of the tci-PresentIn-DCI and the tci-PresentForDCI-Format1-2-r16 in the RRC connected mode, if the offset between all the transmission occasions of the DL DCI and the corresponding PDSCH is less than the threshold timeDurationForQCL.
  b. One or more configured TCI state for the serving cell of scheduled PDSCH contains the 'QCL-TypeD'.
  c. The PDCCH transmission scheduling the PDSCH is configured with the non-SFN scheme-3.
  d. The monitored search space for the PDCCH transmission maps to multiple CORESETs with the different TCI states.
  e. If the UE 100 is configured with enableDefaultTCIStatePerCoresetPoolIndex-r16.
  f. The UE 100 is configured by higher layer parameter PDCCH-Configure that contains two different values of the CORESETPoolIndex in different ControlResourceSets.

If the set of the conditions for the fifth scenario for the non-SFN scheme-3 are satisfied, then the UE 100 assumes that the DM-RS ports of the PDSCH associated with the value of CORESETPoolIndex of the serving cell are QCLed with the RS(s) with respect to the QCL parameter(s)) used for the PDCCH QCL indication of the CORESET associated with the monitored search space with the lowest controlResourceSetId or the highest controlResourceSetId, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE 100.

Further, the UE 100 assumes that the DM-RS ports of PDSCH associated with the value of CORESETPoolIndex of the serving cell are QCLed with the RS(s) with respect to the QCL parameter(s)) used for PDCCH QCL indication of the first CORESET or the last CORESET associated with the monitored search space, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE 100.

Further, the UE 100 assumes that the DM-RS ports of PDSCH associated with the value of CORESETPoolIndex of the serving cell are QCLed with the RS(s) with respect to the QCL parameter(s)) used for PDCCH QCL indication of the CORESET associated with the monitored search space with the lowest controlResourceSetId and configured with the single TCI state, which are configured with the same value of CORESETPoolIndex as the PDCCH scheduling that PDSCH in the latest slot in which one or more CORESETs associated with the same value of CORESETPoolIndex as the PDCCH scheduling that PDSCH within the active BWP of the serving cell are monitored by the UE 100.

Non-SFN Scheme-4

An environment is defined in the non-SFN scheme as follows.

The PDCCH transmission is monitored over more than one search space, each associated with the respective CORESET with the different TCI state corresponding to the different QCL parameters. The same PDCCH information is transmitted over multiple transmission occasions from each TRP in different time resources using TDM or in different frequency resources using FDM. Namely, a first PDCCH information transmitted from a first TRP and a second PDCCH information transmitted from a second TRP may be linked for repetition. Upon reception of the PDCCH occasions from the different search spaces, the UE 100 performs channel estimation over the PDCCH DMRS port considering the different QCL parameters over each occasion, with respect to the configured TCI states.

The default beam behavior of PDSCH is defined as the QCL assumption to be made for PDSCH reception and decoding is performed whenever the PDSCH TCI indication is not available or applicable.

Each scenario in which the default beam is considered is defined by a set of conditions being satisfied, on which the respective behavior is applicable. For each behavior multiple solutions are proposed of which one or more solutions are applied for the respective scenario(s).

I. A set of conditions for a first scenario for the non-SFN scheme-4 is given below:
  a. The PDCCH is configured to be transmitted over multiple transmission occasions in the different CORESETs each with the different TCI states.
  b. The PDCCH transmission scheduling the PDSCH is configured with the non-SFN scheme-4.

If the set of the conditions for the first scenario for the non-SFN scheme-4 are satisfied, then the UE 100 expects the same DL DCI transmitted over more than one CORESET based on the "mTRP scheme" as defined in the $3^{rd}$ generation partnership project (3GPP) Technical Specification (TS) 38.213. Further, the UE 100 expects the time offset between all the transmission occasions of the DL DCI scheduling the same PDSCH and the corresponding PDSCH of the serving cell is greater than or equal to the threshold timeDurationForQCL. In a different embodiment, the UE 100 expects the time offset between all the transmission occasions of the DL DCI scheduling the same PDSCH and the corresponding PDSCH of the serving cell is lesser than the threshold timeDurationForQCL.

II. A set of conditions for a second scenario for the non-SFN scheme-4 is given below:
  a. If the PDSCH is scheduled by the DCI format not having the TCI field present.
  b. The time offset between the reception of all the transmission occasions of the DL DCI and the corresponding PDSCH of the serving cell is greater than or equal to the threshold timeDurationForQCL.
  c. The PDCCH is configured to be transmitted over multiple transmission occasions in different CORESETs each with different TCI states.
  d. The PDCCH transmission scheduling the PDSCH is configured with the non-SFN scheme-4.

If the set of the conditions for the second scenario for the non-SFN scheme-4 are satisfied, then the UE 100 assumes that the TCI state or the QCL assumption for the PDSCH is identical to the TCI state of the CORESET with the lowest ControlResourceSetID, the CORESET with the highest ControlResourceSetID, the first CORESET, the last CORESET, the CORESET allocated with the lowest starting PRB index, or the CORESET allocated with the highest starting PRB index used for the PDCCH transmission within the active BWP of the serving cell, the second scenario of the non-SFN scheme-4 is adopted in standards (i.e., TS 38.213 v17). For example, the UE 100 may expect the same configuration for a first CORESET associated with a first PDCCH candidate and a second CORESET associated with a second PDCCH candidate with respect to presence of TCI field in a received DCI. If the TCI field is not present in the received DCI and the scheduling offset between the reception of the received DCI and the corresponding PDSCH is equal to or larger than timeDurationForQCL, PDSCH QCL assumption is based on the CORESET with lower ID among the first and second CORESETs.

III. A set of conditions for a third scenario for the non-SFN scheme-4 is given below:
  a. When the UE 100 is configured with the CORESET associated with the search space set for cross-carrier scheduling.
  b. The UE 100 is not configured with enableDefaultBeamForCCSS.
  c. If one or more of the TCI states configured for the serving cell scheduled by the search space set contains 'QCL-TypeD'.
  d. The PDCCH transmission scheduling the PDSCH is configured with the non-SFN scheme-4.

If the set of the conditions for the third scenario for the non-SFN scheme-4 are satisfied, then the UE 100 expects tci-PresentInDCI is set as 'enabled' or tci-PresentForDCI-Format1-2-r16 is configured for the CORESET. Further, the UE 100 expects the time offset between the reception of all the transmission occasions of the DL DCI and the corresponding PDSCH is greater than or equal to the threshold timeDurationForQCL.

IV. A set of conditions for a fourth scenario for the non-SFN scheme-4 is given below:
  a. Independent of the configuration of the tci-PresentInDCI and the tci-PresentForDCI-Format1-2-r16 in the RRC connected mode, if the offset between all the transmission occasions of the DL DCI and the corresponding PDSCH is less than the threshold timeDurationForQCL.
  b. One or more configured TCI states for the serving cell of scheduled PDSCH contains the 'QCL-TypeD'.
  c. The PDCCH transmission scheduling the PDSCH is configured with the non-SFN scheme-4.

If the set of the conditions for the fourth scenario for the non-SFN scheme-4 are satisfied, then the UE 100 assumes that the DM-RS ports of PDSCH of the serving cell are QCLed with the RS(s) with respect to the QCL parameter(s) used for the PDCCH QCL indication of the CORESET associated with the monitored search space in the latest slot in which one or more CORESETs within the active BWP of the serving cell are monitored by the UE 100.

V. A set of conditions for a fifth scenario for the non-SFN scheme-4 is given below:
  a. Independent of the configuration of the tci-PresentInDCI and the tci-PresentForDCI-Format1-2-r16 in the RRC connected mode, if the offset between all the transmission occasions of the DL DCI and the corresponding PDSCH is less than the threshold timeDurationForQCL.
  b. One or more configured TCI states for the serving cell of scheduled PDSCH contains the 'QCL-TypeD'.
  c. The PDCCH transmission scheduling the PDSCH is configured with the non-SFN scheme-4.
  d. The PDCCH transmission is configured over multiple search spaces associated with different CORESETs with different TCI states.
  e. If the UE 100 is configured with the enableDefaultTCIStatePerCoresetPoolIndex-r16.
  f. The UE 100 is configured by higher layer parameter PDCCH-Configure that contains two different values of the CORESETPoolIndex in different ControlResourceSets.

If the set of the conditions for the fifth scenario for the non-SFN scheme-4 are satisfied, then the UE 100 assumes that the DM-RS ports of the PDSCH associated with the value of CORESETPoolIndex of the serving cell are QCLed with the RS(s) with respect to the QCL parameter(s)) used for the PDCCH QCL indication of the CORESET associated with the monitored search space, which is configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE 100.

Default Beam Behavior for the PDCCH

Each scenario in which the default beam is considered is defined by a set of conditions being satisfied, on which the respective behavior is applicable. For each behavior multiple solutions are proposed, of which one or more solutions are applied for the respective scenario(s). The scenario(s) are given below:
 a. Scenario-1 defines the default beam assumptions for the CORESET other than the CORESET with index-0 not configured with the TCI states to be used for PDCCH reception, during the initial access procedure.
 b. Scenario-2 defines the default beam assumptions for the CORESET not configured with the TCI states to be used for PDCCH reception, during RRC reconfiguration.
 c. Scenario-3 defines the default beam assumptions for the CORESET with index-0 not configured with the TCI states to be used for PDCCH reception.
 d. Scenario-4 defines the default beam assumptions for the CORESET with index-0 configured with enough TCI states for PDCCH reception.

Scenario-1's first solution for the SFN scheme: Irrespective of the CORESET configured with the PDCCH repetitions based on the 'SFN scheme', if the UE 100 has not been provided a configuration of TCI state(s) by a tci-StatesPDCCH-ToAddList and a tci-StatesPDCCH-ToReleaseList for the CORESET, or has been provided the initial configuration of more than one TCI states for the CORESET by the tci-StatesPDCCH-ToAddList and the tci-StatesPDCCH-ToReleaseList, but has not received a MAC control element (CE) activation command for one of the TCI states as described in [TS 38.321], the UE 100 assumes that the DM-RS antenna port associated with PDCCH receptions is QCLed with a synchronization signal (SS)/physical broadcast channel (PBCH) block the UE 100 identified during the initial access procedure.

Scenario-1's first solution for the non-SFN scheme: Irrespective of the CORESET configured with PDCCH repetitions based on the 'Non-SFN Scheme', if the UE 100 has not been provided a configuration of TCI state(s) by the tci-StatesPDCCH-ToAddList and the tci-StatesPDCCH-ToReleaseList for the CORESET, or has been provided the initial configuration of more than one TCI states for the CORESET by the tci-StatesPDCCH-ToAddList and the tci-StatesPDCCH-ToReleaseList, but has not received the MAC CE activation command for one of the TCI states as described in [TS 38.321], the UE 100 assumes the PDCCH transmissions are not repeated and that the DM-RS antenna port associated with PDCCH receptions is QCLed with the SS/PBCH block the UE 100 identified during the initial access procedure.

Scenario-1's second solution for the non-SFN scheme: if the UE 100 has not been provided the configuration of TCI state(s) by the tci-StatesPDCCH-ToAddList and the tci-StatesPDCCH-ToReleaseList for the CORESET, or has been provided the initial configuration of more than one TCI states for the CORESET by the tci-StatesPDCCH-ToAddList and the tci-StatesPDCCH-ToReleaseList but has not received the MAC CE activation command for one of the TCI states as described in [TS 38.321], the UE 100 assumes that the DM-RS antenna port associated with PDCCH receptions is QCLed with the SS/PBCH block the UE 100 identified during the initial access procedure. If the CORESET is configured with PDCCH repetitions based on 'Non-SFN Scheme,' the UE 100 assumes that the DM-RS antenna port associated with PDCCH receptions of all the occasions is QCLed with the SS/PBCH block the UE 100 identified during the initial access procedure.

Scenario-1's third solution for the non-SFN scheme: For the first case, if the UE 100 has not been provided the configuration of the TCI state(s) by the tci-StatesPDCCH-ToAddList and the tci-StatesPDCCH-ToReleaseList for the CORESET, the UE 100 assumes that the DM-RS antenna port associated with PDCCH receptions is QCLed with the SS/PBCH block the UE 100 identified during the initial access procedure, if the CORESET is also configured with $N_{rep}$ PDCCH repetitions based on 'Non-SFN Scheme'.

a. First solution for the first case: the UE 100 assumes that the DM-RS antenna port associated with PDCCH receptions of all the transmission occasions are QCLed with the SS/PBCH block the UE 100 identified during the initial access procedure.

b. Second solution for the first case: the UE 100 assumes that the DM-RS antenna port associated with PDCCH receptions of the transmission occasions are QCLed with one of:

i. The first $N_{rep}$ TCI states configured for the PDSCH within the active BWP of the cell in which the PDCCH is monitored;

ii. The last $N_{rep}$ TCI states configured for the PDSCH within the active BWP of the cell in which the PDCCH is monitored;

iii. The first $N_{rep}$ TCI states configured for the PDSCH within the active BWP of the cell in which the PDCCH is monitored, sorted in ascending order based on the TCI state IDs; or iv. The last $N_{rep}$ TCI states configured for the PDSCH within the active BWP of the cell in which the PDCCH is monitored, sorted in ascending order based on the TCI state IDs.

When the UE 100 has been provided a configuration of at least $N_{rep}$ TCI state(s) by the tci-StatesToAddModList and the tci-StatesToReleaseList for the PDSCH, or the UE 100 assumes that the DM-RS antenna port associated with PDCCH receptions of all the transmission occasions are QCLed with the SS/PBCH block the UE 100 identified during the initial access procedure.

c. Third solution for the first case: the UE 100 assumes that the DM-RS antenna port associated with PDCCH reception of the first transmission occasion is QCLed with the SS/PBCH block the UE 100 identified during the initial access procedure; and the remaining $N_{rep}-1$ transmission occasions are QCLed with one of:

i. The first $N_{rep}-1$ TCI states configured for the PDSCH within the active BWP of the cell in which the PDCCH is monitored;

ii. The last $N_{rep}-1$ TCI states configured for the PDSCH within the active BWP of the cell in which the PDCCH is monitored;

iii. The first $N_{rep}-1$ TCI states configured for the PDSCH within the active BWP of the cell in which the PDCCH is monitored, sorted in ascending order based on the TCI state IDs; or iv. The last $N_{rep}-1$ TC states configured for the PDSCH within the active BWP of the cell in which the PDCCH is monitored, sorted in ascending order based on the TCI state IDs.

When the UE 100 has been provided a configuration of at least $N_{rep}-1$ TCI state(s) by the tci-StatesToAddModList and the tci-StatesToReleaseList for the PDSCH, or the UE 100 assumes that the DM-RS antenna port associated with PDCCH receptions of all the transmission occasions are QCLed with the SS/PBCH block the UE 100 identified during the initial access procedure.

Scenario-1's third solution for the non-SFN scheme: For a second case, If the CORESET is configured with $N_{rep}$ PDCCH repetitions based on 'Non-SFN Scheme', and has been provided the initial configuration of more than one TCI state for the CORESET by the tci-StatesPDCCH-ToAddList and the tci-StatesPDCCH-ToReleaseList, but has not received the MAC CE activation command for one of the TCI states as described in [TS 38.321].

a. First solution for the second case: the UE 100 assumes that the DM-RS antenna port associated with PDCCH receptions across multiple transmission occasions are QCLed with one of:

i. The first $N_{rep}$ TCI states configured for the CORESET;

ii. The last $N_{rep}$ TCI states configured for the CORESET;

iii. The first $N_{rep}$ TCI states configured for the CORESET sorted in ascending order based on the TCI state IDs; or iv. The last $N_{rep}$ TCI states configured for the CORESET sorted in ascending order based on the TCI state IDs.

b. Second solution for the second case: the UE 100 assumes that the DM-RS antenna port associated with PDCCH reception of the first transmission occasion is QCLed with the SS/PBCH block the UE 100 identified during the initial access procedure; and the remaining $N_{rep}-1$ transmission occasions are QCLed with one of:

i. The first $N_{rep}-1$ TCI states configured for the CORESET;

ii. The last $N_{rep}-1$ TCI states configured for the CORESET;

iii. The first $N_{rep}-1$ TCI states configured for the CORESET, sorted in ascending order based on the TCI state IDs; or iv. The last $N_{rep}-1$ TCI states configured for the CORESET, sorted in ascending order based on the TCI state IDs.

Scenario-2's first solution for the SFN scheme: Irrespective of the CORESET configured with PDCCH repetitions based on 'SFN scheme', if the UE 100 has been provided the configuration of more than one TCI states by the tci-StatesPDCCH-ToAddList and the tci-StatesPDCCH-ToReleaseList for the CORESET as part of reconfiguration with sync procedure as described in [TS 38.331] but has not received the MAC CE activation command for one of the TCI states as described in [TS 38.321], the UE 100 assumes that the DM-RS antenna port associated with PDCCH receptions is QCLed with the SS/PBCH block or the CSI-RS resource the UE 100 identified during the random access procedure initiated by the reconfiguration with sync procedure as described in [TS 38.331].

Scenario-2's first solution for the non-SFN scheme: Irrespective of the CORESET configured with PDCCH repetitions based on 'Non-SFN Scheme', if the UE 100 has been provided the configuration of more than one TCI states by the tci-StatesPDCCH-ToAddList and the tci-StatesPDCCH-ToReleaseList for the CORESET as part of reconfiguration with sync procedure as described in [TS 38.331], but has not received the MAC CE activation command for one of the TCI states as described in [TS 38.321], the UE 100 assumes that the PDCCH transmissions are not repeated and that the DM-RS antenna port associated with PDCCH receptions is QCLed with the SS/PBCH block or the CSI-RS resource the UE 100 identified during the random access procedure initiated by the reconfiguration with sync procedure as described in [TS 38.331].

Scenario-2's second solution for the non-SFN scheme: if the UE 100 has been provided a configuration of more than one TCI state by the tci-StatesPDCCH-ToAddList and the tci-StatesPDCCH-ToReleaseList for the CORESET as part of reconfiguration with sync procedure as described in [TS 38.331], but has not received the MAC CE activation command for one of the TCI states as described in [TS 38.321], the UE 100 assumes that the DM-RS antenna port associated with PDCCH receptions is QCLed with the SS/PBCH block or the CSI-RS resource the UE 100 identified during the random access procedure initiated by the Reconfiguration with sync procedure as described in [TS 38.331]. If the CORESET is configured with PDCCH repetitions based on 'Non-SFN Scheme,' the UE 100 assumes that the DM-RS antenna port associated with PDCCH receptions of all the transmission occasions are QCLed with the SS/PBCH block or the CSI-RS resource the UE 100 identified during the random access procedure initiated by the reconfiguration with sync procedure as described in [TS 38.331].

Scenario-2's third solution for the non-SFN scheme: if the CORESET is configured with N_rep PDCCH repetitions based on 'Non-SFN Scheme', and if the UE 100 has been provided the configuration of more than one TCI states by the tci-StatesPDCCH-ToAddList and the tci-StatesPDCCH-ToReleaseList for the CORESET as part of reconfiguration with sync procedure as described in [TS 38.331], but has not received a MAC CE activation command for one of the TCI states as described in [TS 38.321].
  a. The UE 100 assumes that the DM-RS antenna port associated with PDCCH receptions across multiple transmission occasions are QCLed with one of:
    i. The first $N_{rep}$ TCI states configured for the CORESET;
    ii. The last $N_{rep}$ TCI states configured for the CORESET;
    iii. The first $N_{rep}$ TCI states configured for the CORESET sorted in ascending order based on the TCI state IDs; or
    iv. The last $N_{rep}$ TCI states configured for the CORESET are sorted in ascending order based on the TCI state IDs.
  b. The UE 100 assumes that the DM-RS antenna port associated with PDCCH reception of the first transmission occasion is QCLed with the SS/PBCH block or the CSI-RS resource the UE 100 identified during the random access procedure initiated by the Reconfiguration with sync procedure as described in [TS 38.331], and the remaining $N_{rep}-1$ transmission occasions are QCLed with one of:
    i. The first $N_{rep}-1$ TCI states configured for the CORESET;
    ii. The last $N_{rep}-1$ TCI states configured for the CORESET;
    iii. The first $N_{rep}-1$ TCI states configured for the CORESET, sorted in ascending order based on the TCI state IDs; or
    iv. The last $N_{rep}-1$ TCI states configured for the CORESET, sorted in ascending order based on the TCI state IDs.

Scenario-3's first solution for the SFN scheme: For the CORESET with index 0, configured with PDCCH reception based on 'SFN scheme', the UE 100 assumes that the DM-RS antenna port for PDCCH receptions in the CORESET is QCLed with one of:
  a. The one or more DL RS configured by the TCI states, where the TCI states are indicated by the MAC CE activation command for the CORESET, if any; or
  b. The SS/PBCH block the UE 100 identified during a most recent random access procedure not initiated by the PDCCH order that triggers a contention-free random access procedure, if no MAC CE activation command indicating the TCI state for the CORESET is received after the most recent random access procedure.

Scenario-3's second solution for the SFN scheme: For the CORESET with index 0, configured with PDCCH reception based on 'SFN Scheme' using N_TCI TCI states, the UE 100 assumes that the DM-RS antenna port for the PDCCH receptions in the CORESET is QCLed with one of:
  a. The one or more DL RS configured by the TCI states, where the TCI states are indicated by the MAC CE activation command for the CORESET, if any;
  b. The SS/PBCH block the UE 100 identified during the most recent random access procedure not initiated by the PDCCH order that triggers the contention-free random access procedure, if the UE 100 has not been provided the configuration of TCI state(s) by the tci-StatesPDCCH-ToAddList and the tci-StatesPDCCH-ToReleaseList for any of the linked CORESETs; or
  c. The $N_{TCI}$ TCI states configured by one of:
    i. The first $N_{TCI}$ TCI states configured for the CORESET;
    ii. The last N_TCI TCI states configured for the CORESET;
    iii. The first $N_{TCI}$ TCI states configured for the CORESET from the list of all TCI states configured for the CORESET sorted in ascending order based on the TCI state IDs; or
    iv. The last $N_{TCI}$ TCI states configured for the CORESET from the list of all TCI states configured for the CORESET sorted in ascending order based on the TCI state IDs.

When no MAC CE activation command indicating the TCI states for the CORESET is received after the most recent random access procedure.
  a. The SS/PBCH block the UE 100 identified during a most recent random access procedure not initiated by the PDCCH order that triggers the contention-free random access procedure along with one of:

i. The first $N_{TCI}$-1 TCI states configured for the CORESET;
ii. The last $N_{TCI}$-1 TCI states configured for the CORESET;
iii. The first $N_{TCI}$-1 TCI states configured for the CORESET from the list of all TCI states configured for the CORESET sorted in ascending order based on the TCI state IDs; or
iv. The last $N_{TCI}$-1 TCI states configured for the CORESET from the list of all TCI states configured for the CORESET sorted in ascending order based on the TCI state IDs.

When no MAC CE activation command indicating the TCI state for the CORESET is received after the most recent random access procedure.

Scenario-3's first solution for the non-SFN scheme: For CORESETs with index 0 and different CoresetPoolIndex, linked for PDCCH repetition based on 'Non-SFN scheme', the UE 100 assumes that the DM-RS antenna port for PDCCH receptions across all transmission occasions in the CORESETs are QCLed with one of:
  a. The one or more DL RS configured by the TCI states, where the TC states are indicated by the MAC CE activation command for the respective CORESETs, if any; or
  b. The SS/PBCH block the UE 100 identified during the most recent random access procedure not initiated by the PDCCH order that triggers the contention-free random access procedure, if no MAC CE activation command indicating the TCI state for any of the links is received after the most recent random access procedure.

Scenario-3's second solution for the non-SFN scheme: For CORESETs with index 0 and different CoresetPoolIndex, linked for N_rep PDCCH repetitions based on 'Non-SFN scheme', the UE 100 assumes that the DM-RS the UE 100 assumes that the DM-RS antenna port for PDCCH receptions across all transmission occasions in the CORESETs is QCLed with one of:
  a. The one or more DL RS configured by the TCI states, where the TCI states are indicated by the MAC CE activation command for the respective CORESETs, if any;
  b. The SS/PBCH block the UE 100 identified during the most recent random access procedure not initiated by the PDCCH order that triggers the contention-free random access procedure, if the UE 100 has not been provided the configuration of TCI state(s) by the tci-StatesPDCCH-ToAddList and the tci-StatesPDCCH-ToReleaseList for any of the linked CORESETs; or
  c. The TCI state is configured by one of:
    i. The first TCI state configured in each of the linked CORESETs;
    ii. The last TCI state configured in each of the linked CORESETs;
    iii. The lowest TC state configured in each of the linked CORESETs; or
    iv. The highest TCI state is configured in each of the linked CORESETs.

When no MAC CE activation command indicating the TCI state for any of the linked CORESETs is received after the most recent random access procedure.
  d. The SS/PBCH block the UE 100 identified during the most recent random access procedure not initiated by the PDCCH order that triggers a contention-free random access procedure for the first transmission occasion and the remaining N_rep-1 transmission occasions QCLed with one of:
    i. The first $N_{rep}$-1 TCI states configured for the CORESET;
    ii. The last $N_{rep}$-1 TCI states configured for the CORESET;
    iii. The first $N_{rep}$-1 TCI states configured for the CORESET sorted in ascending order based on the TCI state IDs; or
    iv. The last $N_{rep}$-1 TCI states configured for the CORESET sorted in ascending order based on the TCI state IDs.

When no MAC CE activation command indicating a TCI state for the CORESET is received after the most recent random access procedure.

Scenario-4's first solution for the SFN scheme: For the CORESET other than the CORESET with index 0 configured with the PDCCH reception based on 'SFN Scheme' using the N_TCI TCI states, if the UE 100 is provided with less than or equal to the N_TCI TCI states for the CORESET, or if the UE 100 receives the MAC CE activation command for less than or equal to the N_TCI TCI states of the provided TCI states for the CORESET, the UE 100 assumes that the DM-RS antenna port associated with the PDCCH receptions in the CORESET is QCLed with the one or more DL RSs configured by all the TCI states. The QCL assumption considered is the combination of all the configured TCI states of the CORESET.

Scenario-4's first solution for the non-SFN scheme: For CORESETs other than the CORESET with index 0 and same or different CoresetPoolIndex, linked for N_rep PDCCH repetitions based on 'Non-SFN Scheme', if the UE 100 is provided the single TCI state for each linked CORESET, or if the UE 100 receives the MAC CE activation command for one of the provided TCI states for each linked CORESET, the UE 100 assumes that the DM-RS antenna port associated with PDCCH receptions across all transmission occasions in the CORESET is QCLed with the one or more DL RSs configured by the TCI states across the linked CORESETs, where each PDCCH occasion is linked with the QCL assumption of the CORESET in which the PDCCH reception occurs.

Default Beam Behavior of PDSCH in the SFN

The default beam behavior of PDSCH is defined as the QCL assumptions to be made for PDSCH reception and decoding is performed whenever the PDSCH TCI indication is not available or applicable.

Each scenario in which the default beam is considered is defined by a set of conditions being satisfied, on which the respective behavior is applicable. For each behavior multiple solutions are proposed of which one or more solution is applied for the respective scenario(s).

The QCL assumption/parameters considered for the CORESET configured with multiple TCI states in the PDCCH QCL indication is the combination of the QCL parameter of each TCI state configured for the CORESET.

I A set of conditions for a first scenario is given below:
  a. If the PDSCH is scheduled by the DCI format not having the TCI field present.
  b. The time offset between the receptions of the DL DCI of the serving cell is greater than or equal to a threshold timeDurationForQCL.
  c. The CORESET used for the PDCCH transmission is configured with more than one TCI state through the MAC CE activation command.

d. The PDCCH transmission scheduling the PDSCH is configured with the SFN scheme.

If the set of the conditions for the first scenario are satisfied, then the UE 100 assumes that the TCI states or the QCL assumption for the PDSCH are identical to the TCI states or QCL assumption, whichever is applied for the CORESET used for the PDCCH transmission within the active BWP of the serving cell, where the QCL assumptions is a combination of the QCL parameters corresponding to one or more TCI states activated for the CORESET.

II. A set of conditions for a second scenario is given below:
  a. Independent of the configuration of the tci-PresentInDCI and the tci-PresentForDCI-Format1-2-r16 in the RRC connected mode, if the offset between the DL DCI and the corresponding PDSCH is less than the threshold timeDurationForQCL.
  b. One or more configured TCI states for the serving cell of scheduled PDSCH contains the 'QCL-TypeD'.
  c. The PDCCH transmission scheduling the PDSCH is configured with the SFN scheme.
  d. The PDCCH QCL indication of the CORESET associated with the monitored search space maps to multiple TCI states.

Scenario-2's first solution for the SFN scheme: the UE 100 may assume that the DM-RS ports of PDSCH of the serving cell are QCLed with the RS(s) with respect to the QCL parameter(s) used for PDCCH QCL indication of the CORESET associated with the monitored search space with the lowest controlResourceSetId, where the QCL parameter(s) is the combination of the QCL parameters corresponding to one or more TCI states activated for the CORESET, in the latest slot in which one or more CORESETs within the active BWP of the serving cell are monitored by the UE 100.

Scenario-2's second solution for the SFN scheme: the UE 100 may assume that the DM-RS ports of PDSCH of a serving cell are QCLed with the RS(s) with respect to the QCL parameter(s) used for PDCCH QCL indication of the CORESET associated with the monitored search space with the lowest controlResourceSetId and configured with the single TCI state, in the latest slot in which one or more CORESETs within the active BWP of the serving cell are monitored by the UE 100.

III. A set of conditions for a third scenario is given below:
  a. Independent of the configuration of the tci-PresentInDCI and the tci-PresentForDCI-Format1-2-r16 in the RRC connected mode, if the offset between the DL DCI and the corresponding PDSCH is less than the threshold timeDurationForQCL.
  b. One or more configured TCI states for the serving cell of scheduled PDSCH contains the 'QCL-TypeD'.
  c. The PDCCH transmission scheduling the PDSCH is configured with the SFN scheme.
  d. The PDCCH quasi co-location indication of the CORESET associated with the monitored search space maps to multiple TCI states.
  e. If the UE 100 is configured with the enableDefaultTCIStatePerCoresetPoolIndex-r16.
  f. The UE 100 is configured by the higher layer parameter PDCCH-Configure that contains the two different values of CORESETPoolIndex in different ControlResourceSets.

Scenario-3's first solution for the SFN scheme: the UE 100 may assume that the DM-RS ports of the PDSCH associated with the value of CORESETPoolIndex of the serving cell are QCLed with the RS(s) with respect to the QCL parameter(s) used for PDCCH quasi co-location indication of the CORESET associated with the monitored search space with the lowest controlResourceSetId, where the QCL parameter(s) is the combination of the QCL parameters corresponding to one or more TCI states activated for the CORESET, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE 100.

Scenario-3's second solution for the SFN scheme: the UE 100 may assume that the DM-RS ports of PDSCH associated with a value of CORESETPoolIndex of the serving cell are QCLed with the RS(s) with respect to the QCL parameter(s) used for the PDSCH QCL indication of the CORESET associated with the monitored search space with the lowest controlResourceSetId, which is configured with the single TCI state, which is configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE 100.

Although the FIG. 1 illustrates various hardware components of the UE 100, it is to be understood that other embodiments are not limited thereto. In other embodiments, the UE 100 may include less or more components. Further, the labels or names of the components are used only for illustrative purpose and do not limit the scope of the disclosure. Additionally, one or more components can be combined together to perform same or substantially similar function to determine the default beam behavior in the wireless network.

Figure 2:
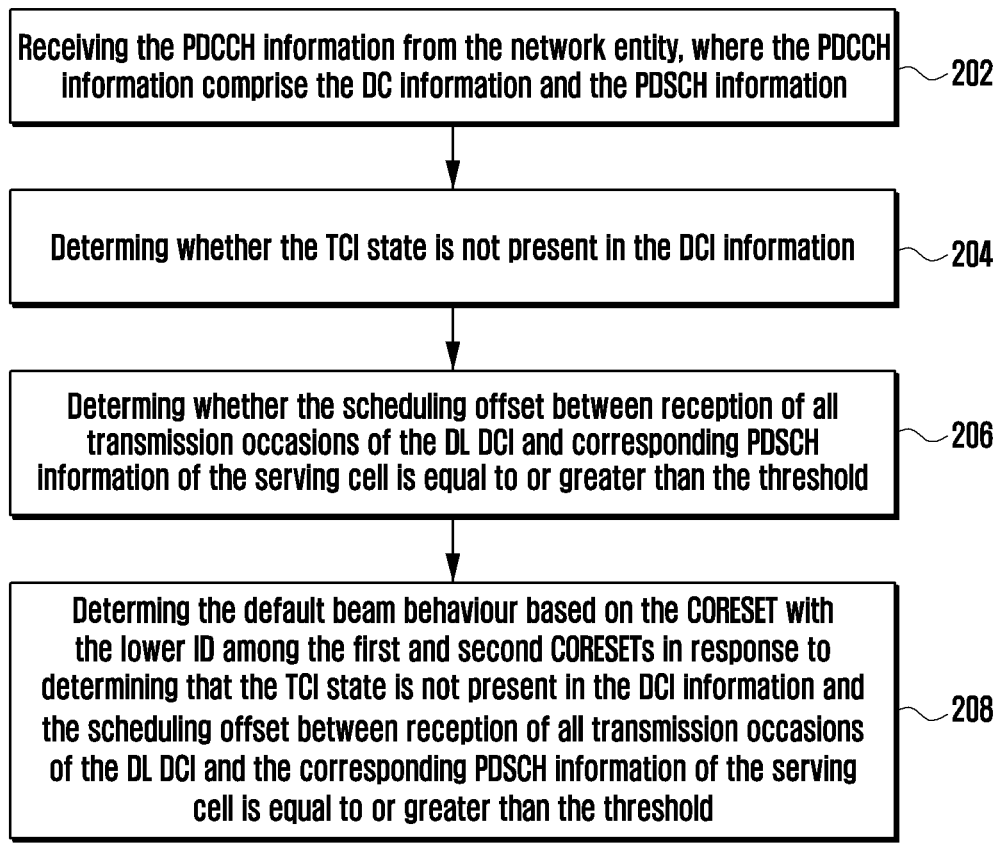
FIG. 2 is a flow diagram illustrating a method for determining default beam behavior in the wireless network, according to an embodiment.

FIG. 2 is a flow diagram illustrating a method for determining default beam behavior in the wireless network, according to an embodiment. For example, the default beam controller 140 may perform steps 202-208 of FIG. 2.

Referring to FIG. 2, in step 202, the default beam controller receives the PDCCH information from the network entity, where the PDCCH information includes the DC information and the PDSCH information.

In step 204, the method includes determining whether the TCI state is not present in the DCI. At 206, the default beam controller determines whether the scheduling offset between reception of all transmission occasions of the DL DCI and corresponding PDSCH information of the serving cell is greater than or equal to the threshold.

In step 208, the default beam controller determines the default beam behavior based on the CORESET with the lowest ID among first and second CORESETs in response to determining that the TC state is not present in the DCI and the scheduling offset between reception of all transmission occasions of the DL DCI and the corresponding PDSCH information of the serving cell is greater than or equal to the threshold.

The various actions, acts, blocks, steps, or the like in FIG. 2 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof

What is claimed is:

1. A method performed by a user equipment (UE) in a wireless network, the method comprising:
   receiving, in a first search space and a second search space that are linked for physical downlink control channel (PDCCH) repetition, at least one PDCCH including downlink control information (DCI); and
   receiving a physical downlink shared channel (PDSCH) scheduled by the DCI based on quasi co-location (QCL) information of a control resource set (CORESET) with a lower identifier (ID) among a first CORESET associated with the first search space and a second CORESET associated with the second search space, in case that the DCI does not include a transmission configuration indication (TCI) field and a time offset between a reception of the DCI and the PDSCH is greater than or equal to a threshold.

2. The method of claim 1, wherein QCL parameters of the first CORESET and QCL parameters of the second CORESET are assumed to be the same by the UE in case that the DCI includes the TCI field.

3. The method of claim 1, wherein the PDCCH is received over multiple transmission occasions from at least one transmit receive point (TRP).

4. The method of claim 3, wherein the PDCCH is received in CORESETs with different TCI states.

5. A user equipment (UE) in a wireless network, the UE comprising:
   a communicator; and
   a controller operably connected to the communicator and configured to:
      receive, in a first search space and a second search space that are linked for physical downlink control channel (PDCCH) repetition, at least one PDCCH including downlink control information (DCI), and
      receive a physical downlink shared channel (PDSCH) scheduled by the DCI based on quasi co-location (QCL) information of a control resource set (CORESET) with a lower identifier (ID) among a first CORESET associated with the first search space and a second CORESET associated with the second search space, in case that the DCI does not include a transmission configuration indication (TCI) field and a time offset between a reception of the DCI and the PDSCH is greater than or equal to a threshold.

6. The UE of claim 5, wherein QCL parameters of the first CORESET and QCL parameters of the second CORESET are assumed to be the same by the UE in case that the DCI includes the TCI field.

7. The UE of claim 5, wherein the PDCCH is received over multiple transmission occasions from at least one transmit receive point (TRP).

8. The UE of claim 7, wherein the PDCCH is received in CORESETs with different TCI states.

* * * * *